US010498925B2

(12) United States Patent
Ono et al.

(10) Patent No.: US 10,498,925 B2
(45) Date of Patent: Dec. 3, 2019

(54) IMAGE PROCESSING TO CONTROL SYNTHESIZING RESULTS OF SHADING CORRECTION WHEN GENERATING WIDER DYNAMIC RANGE IMAGE

(71) Applicant: SONY CORPORATION, Tokyo (JP)

(72) Inventors: Jun Ono, Kanagawa (JP); Yasushi Shibata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/306,051

(22) PCT Filed: Jun. 1, 2017

(86) PCT No.: PCT/JP2017/020394
§ 371 (c)(1),
(2) Date: Nov. 30, 2018

(87) PCT Pub. No.: WO2017/217239
PCT Pub. Date: Dec. 21, 2017

(65) Prior Publication Data
US 2019/0191057 A1 Jun. 20, 2019

(30) Foreign Application Priority Data
Jun. 15, 2016 (JP) ................. 2016-118576

(51) Int. Cl.
H04N 1/407 (2006.01)
G06T 5/00 (2006.01)
(Continued)

(52) U.S. Cl.
CPC .......... H04N 1/4072 (2013.01); G06T 5/002 (2013.01); G06T 5/50 (2013.01); H04N 1/40 (2013.01);
(Continued)

(58) Field of Classification Search
None
See application file for complete search history.

(56) References Cited

U.S. PATENT DOCUMENTS 7,098,946 B1* 8/2006 Koseki ............... H04N 5/23293
348/229.1
9,569,821 B2* 2/2017 Takahashi ................. G06T 5/50
(Continued)

FOREIGN PATENT DOCUMENTS

CN 103024304 A 4/2013
JP 2004-222154 A 8/2004
(Continued)

OTHER PUBLICATIONS

International Search Report and Written Opinion of PCT Application No. PCT/JP2017/020394, dated Aug. 29, 2017, 01 pages of translation and 05 pages of ISRWO.

Primary Examiner — Scott A Rogers
(74) Attorney, Agent, or Firm — Chip Law Group

(57) ABSTRACT

The present disclosure relates to an image processing device, an image processing method, and a program capable of appropriately synthesizing images respectively including pixel signals generated by a plurality of pixels having different sensitivities. The image processing device includes a synthesis rate calculation unit which calculates a synthesis rate by using at least one of results of predetermined filter processing on a plurality of captured images including outputs from the plurality of pixels having different sensitivities, a plurality of shading correction units which performs shading correction processing on each of the plurality of captured images, a moving subject detection unit which detects a moving subject on the basis of the result of multiplying each of the plurality of filter processing results by a gain of the shading correction processing, a synthesis rate control unit which controls the calculated synthesis rate
(Continued)

on the basis of the result of the moving subject detection, and a synthesis unit which synthesizes the plurality of shading processing results according to the controlled synthesis rate. The present disclosure is applied to a case of generating a WD image.

10 Claims, 7 Drawing Sheets

(51) Int. Cl.
    *H04N 5/357*     (2011.01)
    *H04N 1/40*     (2006.01)
    *H04N 5/235*     (2006.01)
    *H04N 5/243*     (2006.01)
    *H04N 5/355*     (2011.01)
    *G06T 5/50*     (2006.01)
    *H04N 1/409*     (2006.01)
    *H04N 5/365*     (2011.01)

(52) U.S. Cl.
    CPC ............ *H04N 1/409* (2013.01); *H04N 5/235* (2013.01); *H04N 5/243* (2013.01); *H04N 5/355* (2013.01); *H04N 5/357* (2013.01); *H04N 5/365* (2013.01)

(56) References Cited

U.S. PATENT DOCUMENTS

| | | | |
|---|---|---|---|
| 2004/0051790 A1* | 3/2004 | Tamaru | H04N 5/202 348/223.1 |
| 2007/0146538 A1* | 6/2007 | Kakinuma | H04N 5/144 348/362 |
| 2009/0323093 A1* | 12/2009 | On | G06T 5/009 358/1.9 |
| 2012/0086829 A1* | 4/2012 | Hohjoh | H04N 5/772 348/223.1 |
| 2013/0076953 A1 | 3/2013 | Sekine | |
| 2013/0083226 A1* | 4/2013 | Kwan | G06T 5/50 348/302 |
| 2013/0329091 A1* | 12/2013 | Sato | H04N 5/217 348/240.99 |
| 2014/0071311 A1 | 3/2014 | Makino | |

FOREIGN PATENT DOCUMENTS

| | | |
|---|---|---|
| JP | 2013-070245 A | 4/2013 |
| JP | 2014-053823 A | 3/2014 |
| KR | 10-2013-0032234 A | 4/2013 |
| TW | 201315219 A | 4/2013 |

\* cited by examiner

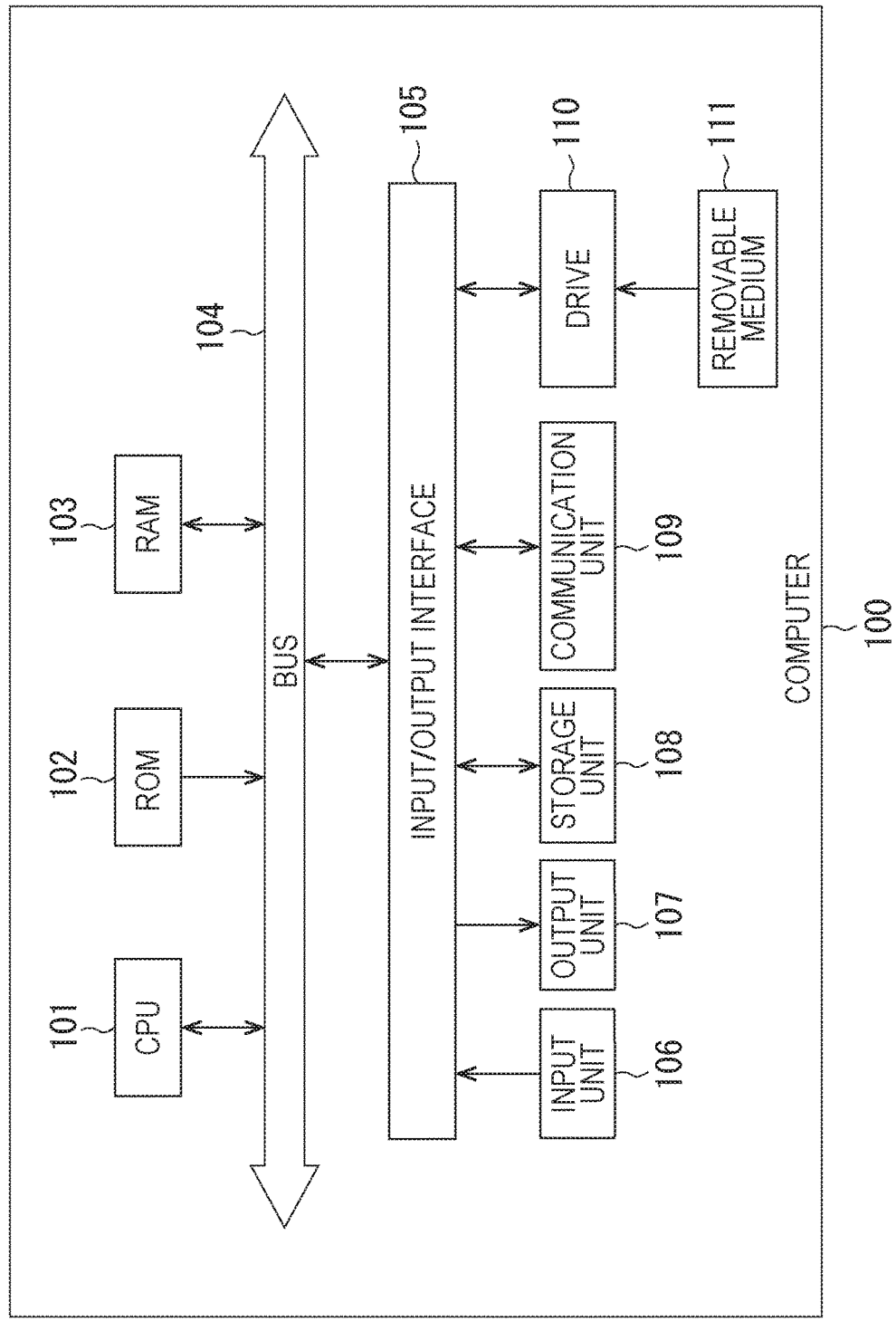

IMAGE PROCESSING TO CONTROL SYNTHESIZING RESULTS OF SHADING CORRECTION WHEN GENERATING WIDER DYNAMIC RANGE IMAGE

CROSS REFERENCE TO RELATED APPLICATIONS

This application is a U.S. National Phase of International Patent Application No. PCT/JP2017/020394 filed on Jun. 1, 2017, which claims priority benefit of Japanese Patent Application No. JP 2016-118576 filed in the Japan Patent Office on Jun. 15, 2016. Each of the above-referenced applications is hereby incorporated herein by reference in its entirety.

TECHNICAL FIELD

The present disclosure relates to an image processing device, an image processing method, and a program, and more particularly, to an image processing device, an image processing method, and a program preferably used in a case where an image with a wider dynamic range is generated by synthesizing images including outputs from a plurality of pixels having different sensitivities.

BACKGROUND ART

Conventionally, as a method of generating an image with wider dynamic range (referred to as WD image below), a method has been known in which a first pixel and a second pixel having different sensitivities are provided on a pixel array such as a CMOS image sensor to synthesize a first image and a second image including respective outputs from the first pixel and the second pixel. Specifically, a synthesis rate is calculated on the basis of at least one of signal levels of the first image and the second image, a moving body is detected on the basis of a difference between the first image and the second image, and a synthesis rate of a region where the moving body is detected is adjusted. Accordingly, deterioration in quality of an image caused by artifacts of a moving subject, noise at the boundary of synthesized images, and the like can be prevented.

Here, as a method of providing the pixels having different sensitivities, for example there are a method of providing a pixel having a long exposure time and a pixel having a short exposure time and a method of providing a pixel having a wide light receiving area and a narrow light receiving area (for example, refer to Patent Document 1).

CITATION LIST

Patent Document

Patent Document 1: Japanese Patent Application Laid-Open No. 2004-222154

SUMMARY OF THE INVENTION

Problems to be Solved by the Invention

In a case where the large pixel image and the small pixel image are synthesized which respectively include outputs from the pixel having a wide light receiving area (referred to as large pixel below) and the pixel having a narrow light receiving area (referred to as small pixel) described above, shapes of shadings (referred to as SHD below) of the large pixel image and the small pixel image are different from each other, and this will be a problem. Here, the shading indicates a phenomenon in which luminance unevenness occurs on an image.

That is, according to a conventional method of generating a WD image, the moving body is detected without considering correction of the shading. Therefore, in a case where the moving body is detected on the basis of a difference between the large pixel image and the small pixel image having different shading shapes, accuracy of the detection is deteriorated. As a result, in the synthesized WD image, the quality of the image may be deteriorated by the artifacts of the moving subject, and the noise may occur at the boundary where the large pixel image and the small pixel image are synthesized.

The present disclosure has been made in view of the above circumstances and is intended to appropriately synthesize images including pixel signals generated by a plurality of pixels having different sensitivities.

Solutions to Problems

An image processing device includes a plurality of filtering units which performs predetermined filter processing on each of a plurality of captured images including outputs from a plurality of pixels having different sensitivities, a synthesis rate calculation unit which calculates a synthesis rate by using at least one of filter processing results by the plurality of filtering units, a plurality of shading correction units which performs shading correction processing respectively on the plurality of captured images, a moving subject detection unit which detects a moving subject on the basis of a result of multiplying each of the filter processing results by the plurality of filtering units by a gain at the time of performing the shading correction processing on the corresponding captured image, a synthesis rate control unit which controls the calculated synthesis rate on the basis of the result of the moving subject detection, and a synthesis unit which synthesizes shading processing results by the plurality of shading correction units according to the controlled synthesis rate.

The plurality of captured images can be a large pixel image including an output of a large pixel and a small pixel image including an output of a small pixel having narrower light receiving area than the large pixel.

The large pixel image and the small pixel image can have different exposure times.

The moving subject detection unit can detect a moving subject on the basis of a comparison result between a difference of results of multiplying the filter processing results by the plurality of filtering units by a gain at the time of performing the shading correction processing on the corresponding captured image and a predetermined threshold.

The shading correction unit can perform the shading correction processing on the captured image before being input to the filtering unit.

The shading correction unit can perform the shading correction processing on the captured image which has passed through the filtering unit.

The shading correction unit can perform the shading correction processing on the captured image on which the filter processing has been performed by the filtering unit.

The synthesis rate control unit can control the synthesis rate so as to apply the calculated synthesis rate to a region where the moving subject is not detected and to preferentially use any one of the shading processing results by the plurality of shading correction units on a region where the moving subject is detected.

An image processing method according to one aspect of the present disclosure includes a filter processing step of performing predetermined filter processing on each of a plurality of captured images including outputs from a plurality of pixels having different sensitivities, a synthesis rate calculation step of calculating a synthesis rate by using at least one of a plurality of filter processing results by the filter processing step, a shading correction step of performing shading correction processing on each of the plurality of captured images, a moving subject detection step of detecting a moving subject on the basis of a result of multiplying each of the plurality of filter processing results by the filter processing step by a gain at the time of performing the shading correction processing on the corresponding captured image, a synthesis rate control step of controlling the calculated synthesis rate on the basis of the result of the moving subject detection, and a synthesis step of synthesizing shading processing results by the plurality of shading correction units according to the controlled synthesis rate.

A non-transitory computer-readable storage medium which stores a program according to one aspect of the present disclosure for causing a computer to function as a plurality of filtering units which performs predetermined filter processing on each of a plurality of captured images including outputs from a plurality of pixels having different sensitivities, a synthesis rate calculation unit which calculates a synthesis rate by using at least one of filter processing results by the plurality of filtering units, a plurality of shading correction units which performs shading correction processing respectively on the plurality of captured images, a moving subject detection unit which detects a moving subject on the basis of a result of multiplying each of the filter processing results by the plurality of filtering units by a gain at the time of performing the shading correction processing on the corresponding captured image, a synthesis rate control unit which controls the calculated synthesis rate on the basis of the result of the moving subject detection, and a synthesis unit which synthesizes shading processing results by the plurality of shading correction units according to the controlled synthesis rate.

According to one aspect of the present disclosure, predetermined filter processing is performed on each of the plurality of captured images including outputs of the plurality of pixels having different sensitivities, and the synthesis rate is calculated by using at least one of the plurality of filter processing results. Furthermore, shading correction processing is performed on each of the plurality of captured images, a moving subject is detected on the basis of a result of multiplying each of the plurality of filter processing results by a gain at the time of performing the shading correction processing on the corresponding captured image, the calculated synthesis rate is controlled on the basis of the result of the moving subject detection, and the plurality of shading processing results is synthesized.

Effects of the Invention

According to one aspect of the present disclosure, images including pixel signals generated by a plurality of pixels having different sensitivities can be appropriately synthesized.

BRIEF DESCRIPTION OF DRAWINGS

FIG. 7 is a block diagram of an exemplary configuration of a general-purpose computer.

MODE FOR CARRYING OUT THE INVENTION

Hereinafter, best modes (referred to as embodiments below) for carrying out the present disclosure will be described in detail with reference to the drawings.

Figure 1:
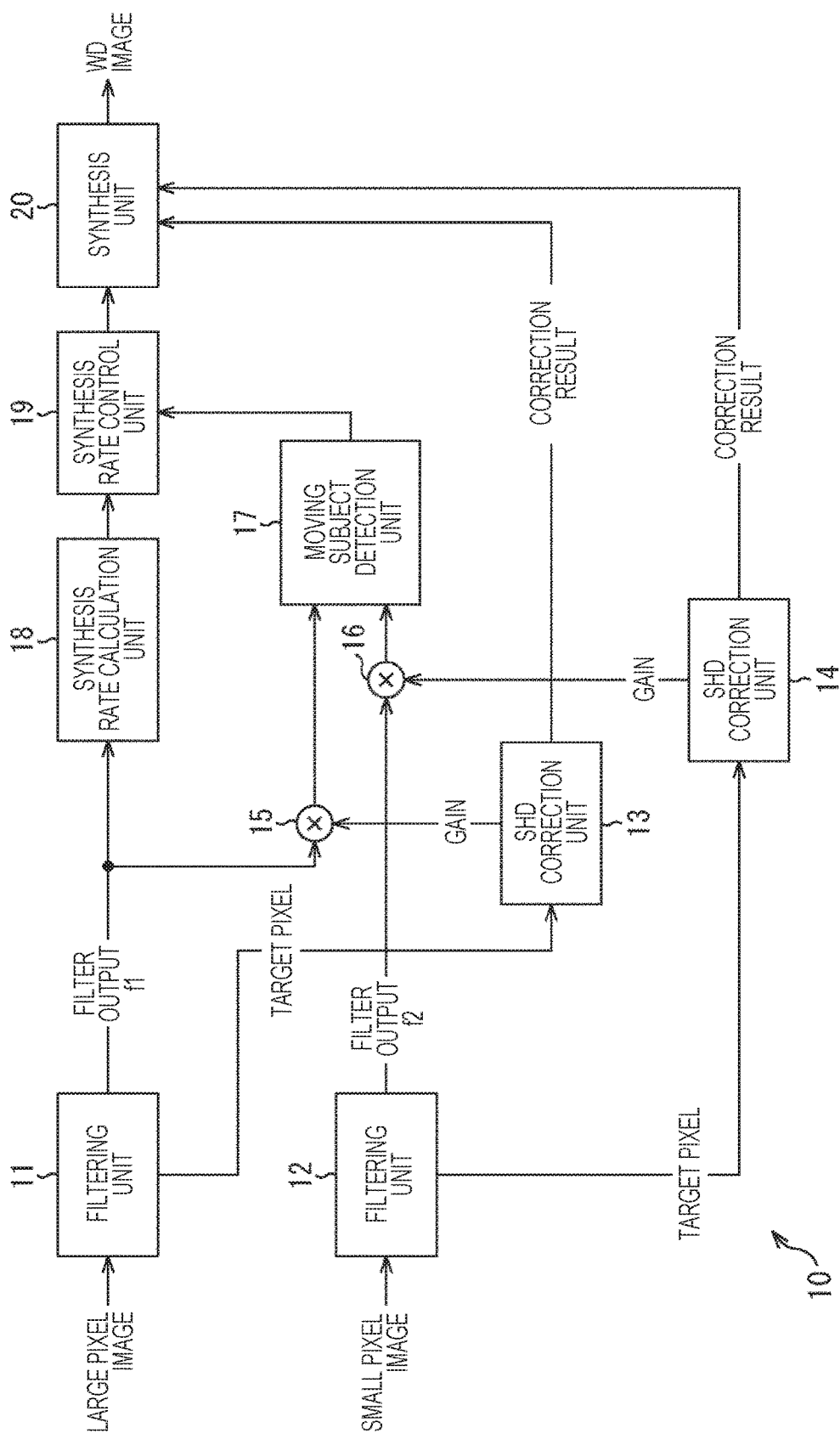
FIG. 1 is a block diagram of a first configuration example of an image processing device to which the present disclosure is applied.

Configuration Example of Image Processing Device According to First Embodiment of Present Disclosure FIG. 1 illustrates a configuration example (first configuration example) of an image processing device which is a first embodiment of the present disclosure.

An image processing device 10 receives a first image and a second image as inputs respectively including outputs from a first pixel and a second pixel, having different sensitivities from each other, arranged on a pixel array such as a CMOS image sensor, and the images are synthesized to form a WD image.

In a case of FIG. 1, the first image is (RAW data of) a large pixel image including an output of a large pixel, and the second image is (RAW data of) a small pixel image including an output of a small pixel having the same exposure time as the large pixel.

The image processing device 10 includes filtering units 11 and 12, SHD correction units 13 and 14, multiplication units 15 and 16, a moving subject detection unit 17, a synthesis rate calculation unit 18, a synthesis rate control unit 19, and a synthesis unit 20.

The filtering unit 11 receives a large pixel image as an input, sequentially sets each pixel (large pixel) included in the large pixel image as a target pixel, and outputs the target pixel to the SHD correction unit 13. Furthermore, the filtering unit 11 performs predetermined filter processing (for example, gaussian filter processing) with reference to the target pixel and outputs a filter output f1 corresponding to the target pixel obtained as a result of the filter processing to the multiplication unit 15 and the synthesis rate calculation unit 18.

Similarly, the filtering unit 12 receives the small pixel image as an input, sequentially sets each pixel (small pixel) included in the small pixel image as a target pixel, and outputs the target pixel to the SHD correction unit 14. Furthermore, the filtering unit 12 performs predetermined filter processing (for example, gaussian filter processing) with reference to the target pixel and outputs a filter output f2 corresponding to the target pixel obtained as a result of the filter processing to the multiplication unit 16.

The SHD correction unit 13 performs shading correction processing for multiplying a gain corresponding to a position in the large pixel image by the target pixel of the large pixel image input from the filtering unit 11 and outputs the corrected target pixel to the synthesis unit 20. At the same time, the SHD correction unit 13 notifies the multiplication unit 15 of the gain in the shading correction processing.

Similarly, the SHD correction unit 14 performs shading correction processing for multiplying a gain corresponding to a position in the small pixel image by the target pixel of the small pixel image input from the filtering unit 12 and outputs the corrected target pixel to the synthesis unit 20. At the same time, the SHD correction unit 14 notifies the multiplication unit 16 of the gain in the shading correction processing.

The multiplication unit 15 multiplies the gain notified from the SHD correction unit 13 by the filter output f1 (result of filtering relative to target pixel of large pixel image) and outputs the multiplication result to the moving subject detection unit 17. Therefore, the output of the multiplication unit 15 is substantially the result of SHD correction processing on the filter output f1.

Similarly, the multiplication unit 16 multiplies the gain notified from the SHD correction unit 14 by the filter output f2 (result of filtering relative to target pixel of small pixel image) and outputs the multiplication result to the moving subject detection unit 17. Therefore, the output of the multiplication unit 16 is substantially the result of SHD correction processing on the filter output f2.

The moving subject detection unit 17 calculates a difference between the multiplication result of the multiplication unit 15 and the multiplication result of the multiplication unit 16, detects a region where the calculated difference is equal to or more than a predetermined first threshold as a moving subject region, and outputs the detection result to the synthesis rate control unit 19.

The synthesis rate calculation unit 18 calculates a synthesis rate at the time when the large pixel image and the small pixel image are α-blended for each pixel on the basis of the filter output f1 (result of filtering relative to target pixel of large pixel image) and notifies the calculated rate to the synthesis rate control unit 19. At this time, in a case where the filter output f1 is equal to or more than a predetermined threshold, there is a possibility that the value of the large pixel is saturated. Therefore, the synthesis rate is determined so as to employ only the small pixel without synthesizing the large pixel.

The synthesis rate control unit 19 controls the synthesis rate so as not to apply the synthesis rate notified from the synthesis rate calculation unit 18 regarding the moving subject region and preferentially employ the large pixel image on the basis of the detection result of the moving subject detection unit 17, and to apply the synthesis rate notified from the synthesis rate calculation unit 18 regarding regions other than the moving subject region and notifies the result to the synthesis unit 20. Note that, regarding the moving subject region, it is possible that the small pixel image is preferentially employed without applying the synthesis rate notified from the synthesis rate calculation unit 18.

According to the notification from the synthesis rate control unit 19, the synthesis unit 20 synthesizes the output of the SHD correction unit 13 (target pixel of large pixel image which has been SHD corrected) with the output of the SHD correction unit 14 (target pixel of small pixel image which has been SHD corrected) by α-blending the outputs with the synthesis rate corresponding to the target pixels to generate a WD image.

<Operation of Image Processing Device 10>

Figure 2:
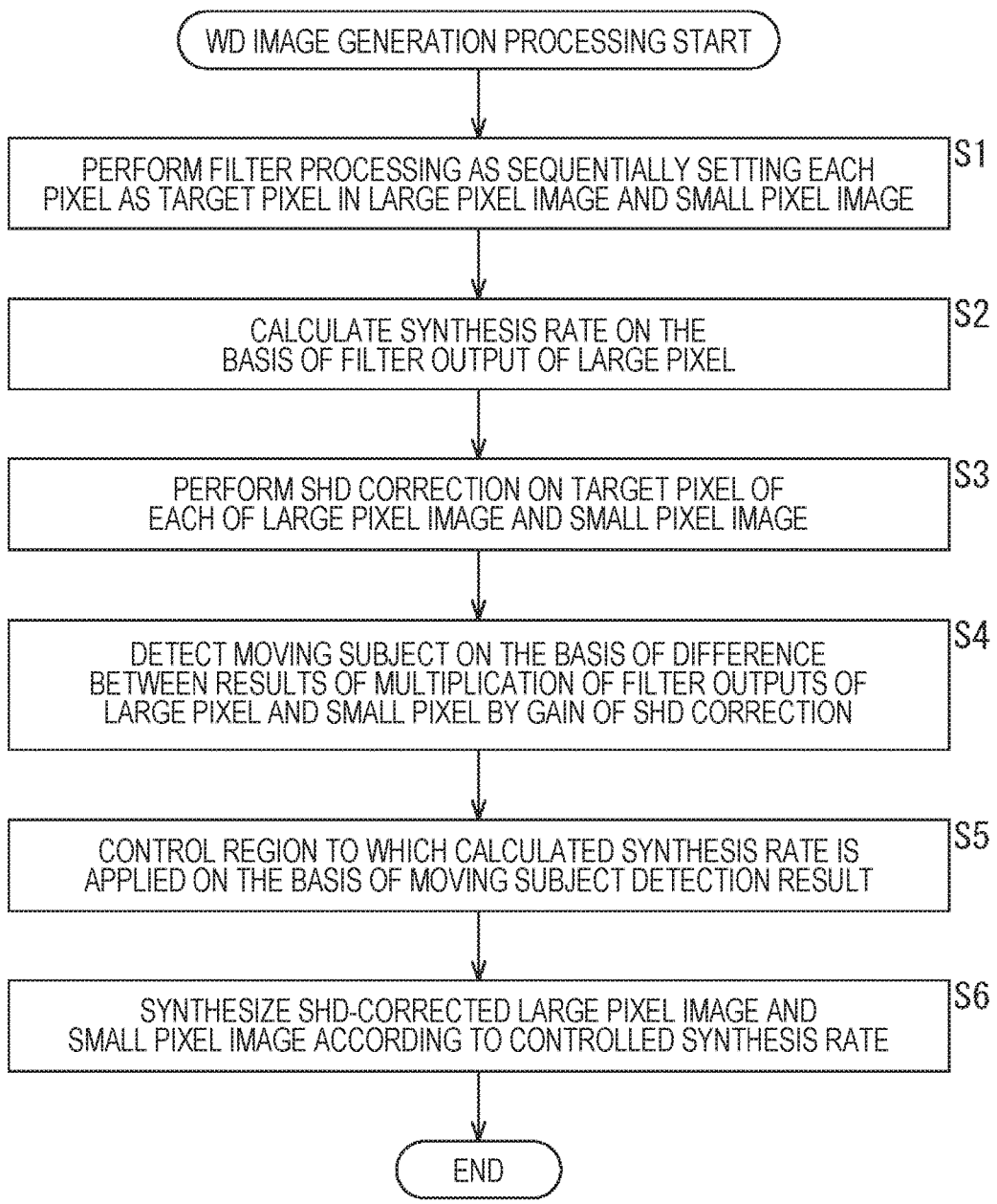
FIG. 2 is a flowchart for explaining WD image generation processing.

Next, FIG. 2 is a flowchart for explaining WD image generation processing by the image processing device 10.

In step S1, the filtering unit 11 sequentially sets each pixel (large pixel) included in the input large pixel image as a target pixel and outputs the target pixel to the SHD correction unit 13. Furthermore, the filtering unit 11 performs predetermined filter processing with reference to the target pixel and outputs the filter output f1 corresponding to the target pixel obtained as a result of the filter processing to the multiplication unit 15 and the synthesis rate calculation unit 18.

Similarly, the filtering unit 12 sequentially sets each pixel (small pixel) included in the input small pixel image as a target pixel and outputs the target pixel to the SHD correction unit 14. Furthermore, the filtering unit 12 performs predetermined filter processing with reference to the target pixel and outputs the filter output f2 corresponding to the target pixel obtained as a result of the filter processing to the multiplication unit 16.

In step S2, the synthesis rate calculation unit 18 calculates a synthesis rate at the time when the large pixel image and the small pixel image are α-blended on the basis of the filter output f1 (result of filtering relative to target pixel of large pixel image) and notifies the calculated rate to the synthesis rate control unit 19.

In step S3, the SHD correction unit 13 performs the shading correction processing on the target pixel of the large pixel image input from the filtering unit 11, outputs the corrected target pixel to the synthesis unit 20, and notifies the multiplication unit 15 of the gain in the shading correction processing. The multiplication unit 15 multiplies the filter output f1 by the gain notified by the SHD correction unit 13 and outputs the multiplication result to the moving subject detection unit 17. Similarly, the SHD correction unit 14 performs shading correction processing on the target pixel of the small pixel image input from the filtering unit 12, outputs the corrected target pixel to the synthesis unit 20, and notifies the multiplication unit 16 of the gain in the shading correction processing. The multiplication unit 16 multiplies the filter output f2 by the gain notified from the SHD correction unit 14 and outputs the multiplication result to the moving subject detection unit 17.

In step S4, the moving subject detection unit 17 calculates a difference between the multiplication result of the multiplication unit 15 and the multiplication result of the multiplication unit 16, detects a region where the calculated difference is equal to or more than a predetermined threshold as a moving subject region, and outputs the detection result to the synthesis rate control unit 19.

In step S5, the synthesis rate control unit 19 controls the synthesis rate on the basis of the detection result of the moving subject detection unit 17. Specifically, the synthesis rate control unit 19 controls the synthesis rate so as not to apply the synthesis rate notified from the synthesis rate calculation unit 18 regarding the moving subject region and preferentially employ the large pixel image, and to apply the synthesis rate notified from the synthesis rate calculation unit 18 regarding regions other than the moving subject region and notifies the result to the synthesis unit 20.

In step S6, according to the notification from the synthesis rate control unit 19, the synthesis unit 20 synthesizes the output of the SHD correction unit 13 (target pixel of large pixel image which has been SHD corrected) with the output of the SHD correction unit 14 (target pixel of small pixel image which has been SHD corrected) by α-blending the outputs with the synthesis rate corresponding to the target pixels to generate a WD image. This concludes the WD image generation processing.

According to the WD image generation processing described above, since a moving subject is detected on the basis of the image on which the shading correction processing has been performed, deterioration in the accuracy of the detection can be prevented. Therefore, it is possible to appropriately control the synthesis rate on the basis of the moving subject region and appropriately synthesize the large pixel image with the small pixel image.

Figure 3:
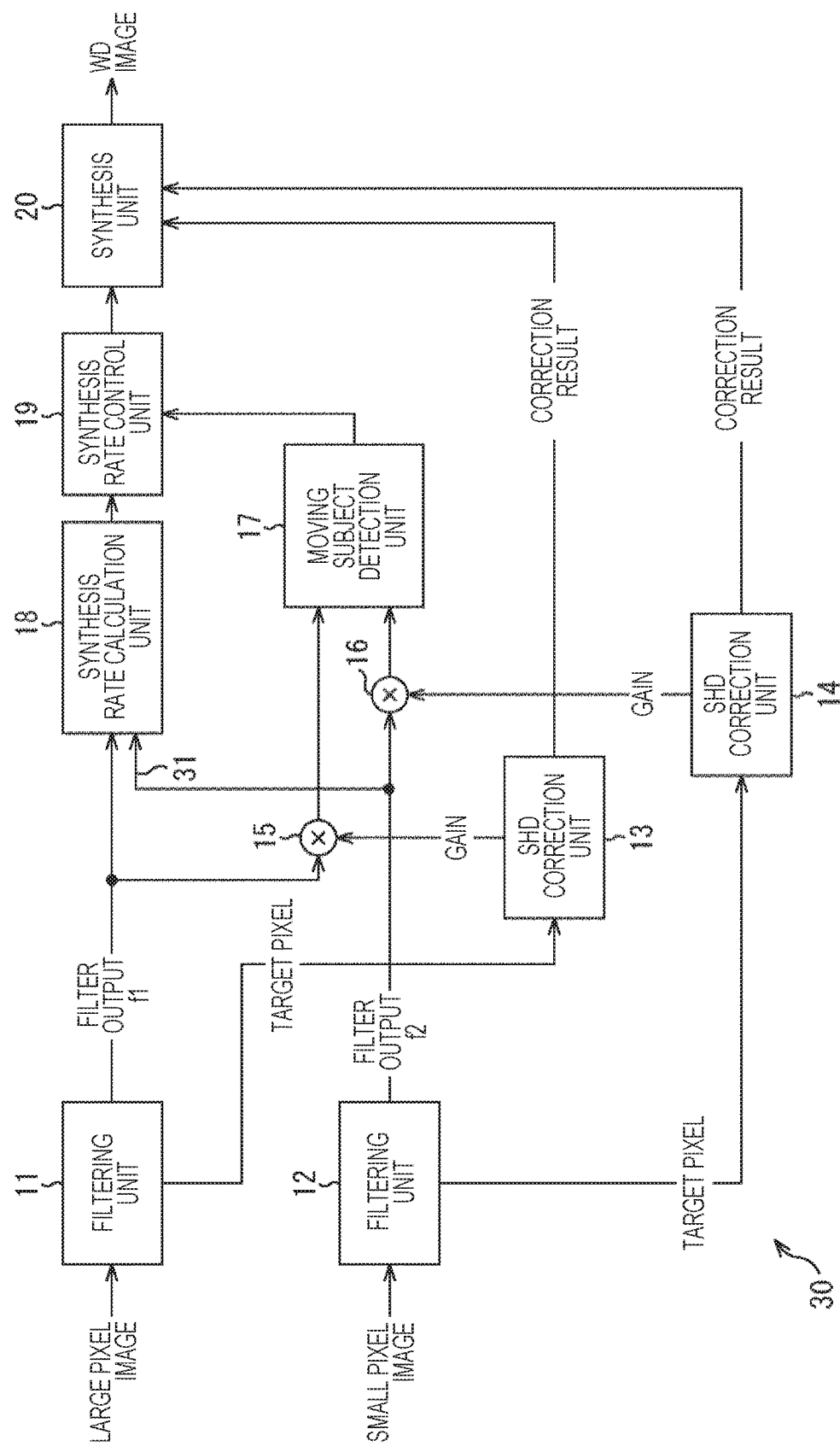
FIG. 3 is a block diagram of a second configuration example of the image processing device to which the present disclosure is applied.

Configuration Example of Image Processing Device According to Second Embodiment of Present Disclosure FIG. 3 illustrates a configuration example (second configuration example) of an image processing device which is a second embodiment of the present disclosure.

An image processing device 30 is obtained by adding a wiring 31 which supplies a filter output f2 from a filtering unit 12 to a synthesis rate calculation unit 18 to the image processing device 10 illustrated in FIG. 1. Other components of the image processing device 30 are the same as those of the image processing device 10 and are denoted with the same reference numerals. Therefore, description thereof will be omitted.

However, a synthesis rate calculation unit 18 in the image processing device 30 calculates a synthesis rate at the time when a large pixel image and a small pixel image are α-blended per pixel on the basis of at least one of filter outputs f1 or f2 and notifies a synthesis rate control unit 19 of the synthesis rate. At this time, in a case where the filter output f1 is equal to or more than a predetermined first threshold, there is a possibility that the value of the large pixel is saturated. Therefore, the synthesis rate is determined so as to employ only the small pixel without synthesizing the large pixel. Furthermore, in a case where the filter output f2 is equal to or more than a predetermined second threshold, there is a possibility that the value of the large pixel is saturated. Therefore, the synthesis rate is determined so as to employ only the small pixel without synthesizing the small pixel.

Operations of the image processing device 30 other than the synthesis rate calculation unit 18 are similar to the WD image generation processing by the image processing device 10. Therefore, description thereof will be omitted.

Figure 4:
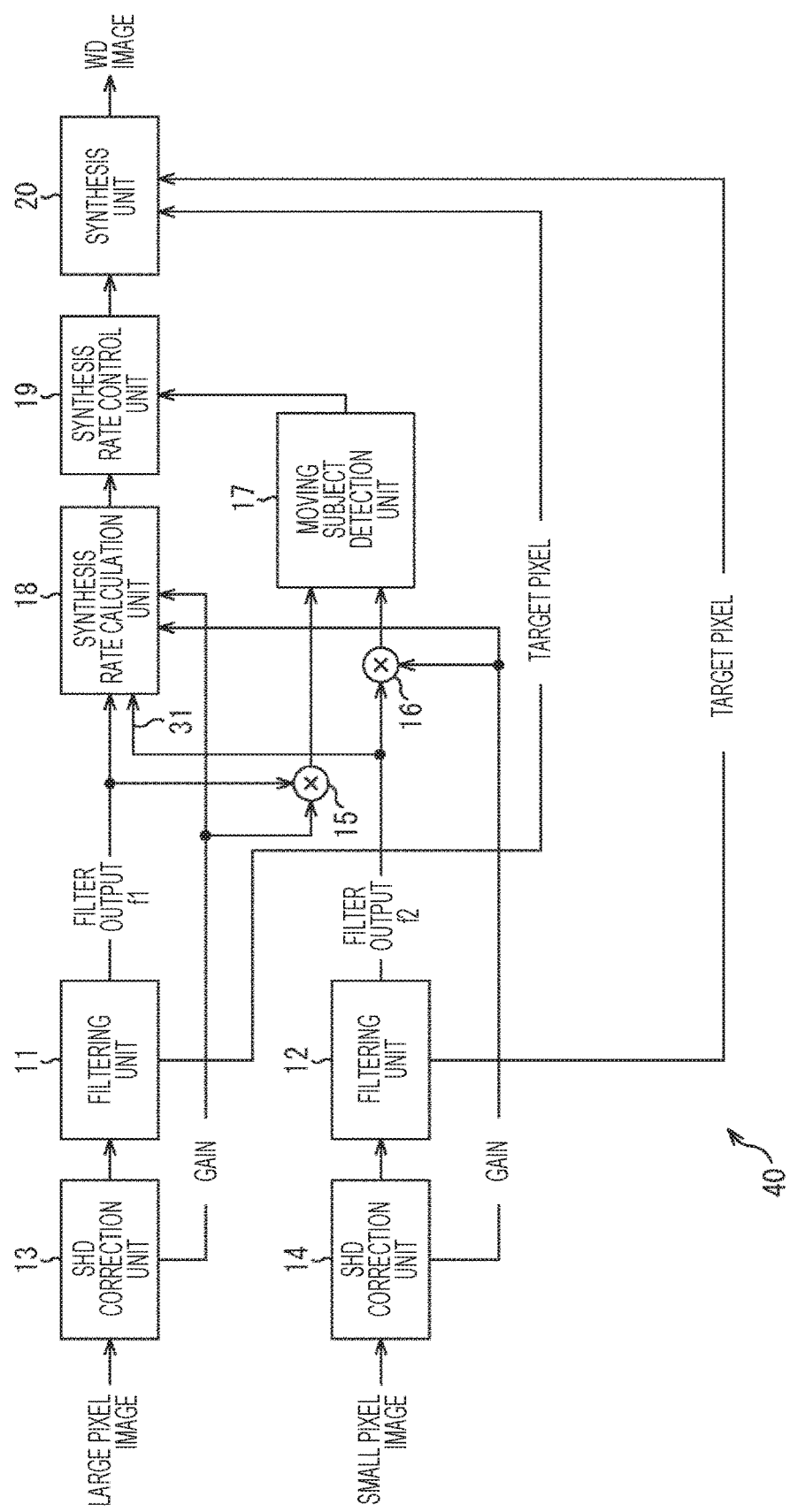
FIG. 4 is a block diagram of a third configuration example of the image processing device to which the present disclosure is applied.

Configuration Example of Image Processing Device According to Third Embodiment of Present Disclosure FIG. 4 illustrates a configuration example (third configuration example) of an image processing device which is a third embodiment of the present disclosure.

In an image processing device 40, the SHD correction units 13 and 14 of the image processing device 30 illustrated in FIG. 3 are moved to a previous stage of a filtering unit 11. Other components of the image processing device 40 are the same as those of the image processing device 30 and are denoted with the same reference numerals. Therefore, description thereof will be omitted.

However, a synthesis rate calculation unit 18 in the image processing device 40 calculates a synthesis rate at the time when a large pixel image and a small pixel image are α-blended per pixel on the basis of at least one of filter outputs f1 or f2 which have been SHD corrected and notifies a synthesis rate control unit 19 of the synthesis rate. Therefore, it is necessary to multiply a first threshold compared with the filter output f1 by a gain of SHD correction processing by a SHD correction unit 13 and correct the first threshold. Similarly, it is necessary to multiply a second threshold compared with the filter output f2 by a gain of SHD correction processing by a SHD correction unit 14 and correct the second threshold.

Operations of the image processing device 40 other than the synthesis rate calculation unit 18 are similar to the WD image generation processing by the image processing device 10. Therefore, description thereof will be omitted.

According to the image processing device 40, an output (WD image) equivalent to that of the image processing device 30 can be obtained.

Figure 5:
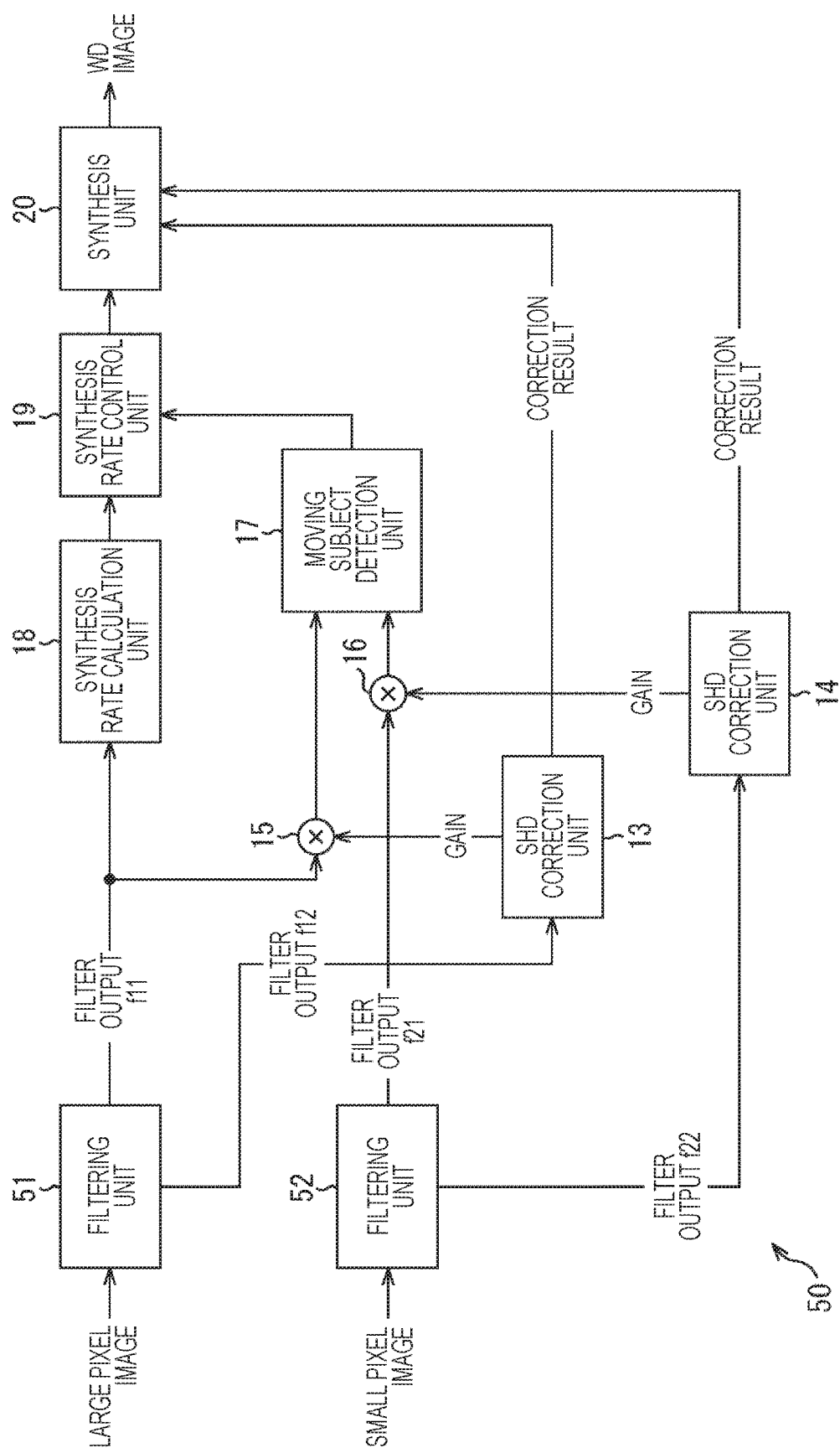
FIG. 5 is a block diagram of a fourth configuration example of the image processing device to which the present disclosure is applied.

Configuration Example of Image Processing Device According to Fourth Embodiment of Present Disclosure FIG. 5 illustrates a configuration example (fourth configuration example) of an image processing device which is a fourth embodiment of the present disclosure.

In an image processing device 50, the filtering units 11 and 12 of the image processing device 10 illustrated in FIG. 1 are respectively replaced with filtering units 51 and 52.

The filtering unit 51 receives a large pixel image, sequentially sets each pixel (large pixel) included in the large pixel image as a target pixel, performs predetermined filter processing (for example, gaussian filter processing) with reference to the target pixel, and outputs a filter output f11 corresponding to the target pixel obtained as a result of the filter processing to a multiplication unit 15 and a synthesis rate calculation unit 18. Furthermore, the filtering unit 51 performs predetermined filter processing (for example, noise reduction (NR) filter processing) with reference to the target pixel and outputs a filter output f12 corresponding to the target pixel obtained as a result of the filter processing to a SHD correction unit 13.

Similarly, the filtering unit 52 receives a small pixel image as an input, sequentially set a each pixel (small pixel) included in the small pixel image as a target pixel, performs predetermined filter processing (for example, gaussian filter processing) with reference to the target pixel, and outputs a filter output f21 corresponding to the target pixel obtained as a result of the filter processing to a multiplication unit 16. Furthermore, the filtering unit 52 performs predetermined filter processing (for example, NR filter processing) with reference to the target pixel and outputs a filter output f22 corresponding to the target pixel obtained as a result of the filter processing to a SHD correction unit 14.

Other components of the image processing device 50 are the same as those of the image processing device 10 and are denoted with the same reference numerals. Therefore, description thereof will be omitted.

According to the image processing device 50, an output (WD image) in which overall noise is suppressed as compared with the output of the image processing device 10 can be obtained.

Figure 6:
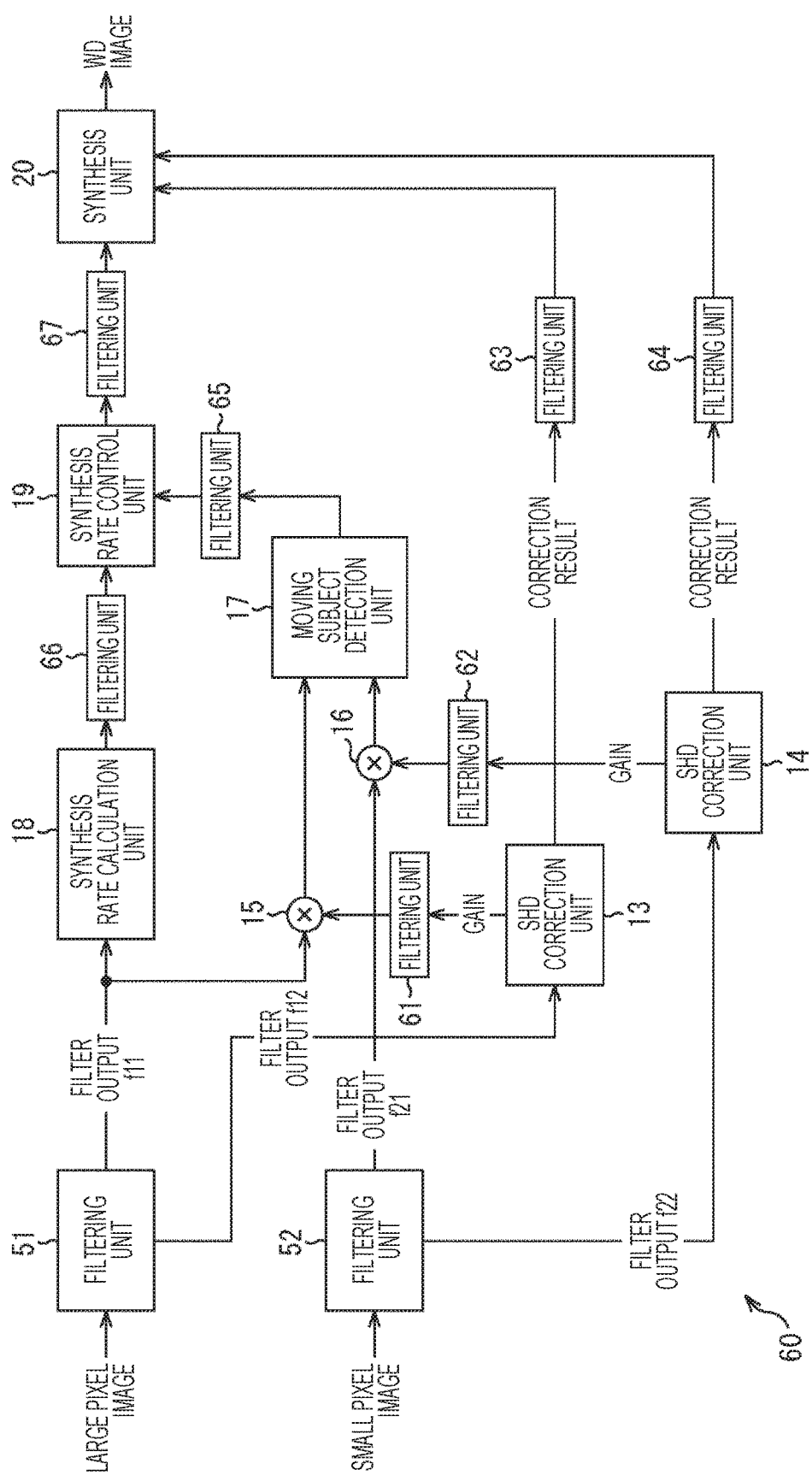
FIG. 6 is a block diagram of a fifth configuration example of the image processing device to which the present disclosure is applied.

Configuration Example of Image Processing Device According to Fifth Embodiment of Present Disclosure FIG. 6 illustrates a configuration example (fifth configuration example) of an image processing device which is a fifth embodiment of the present disclosure.

An image processing device 60 is obtained by adding filtering units 61 to 67 for performing predetermined filter processing to the image processing device 50 illustrated in FIG. 5.

In other words, for example, the filtering unit 61 performs interpolation filter processing and is arranged between a SHD correction unit 13 and a multiplication unit 15. Similarly, for example, the filtering unit 62 performs interpolation filter processing and is arranged between a SHD correction unit 14 and a multiplication unit 16.

The filtering unit 63, for example, performs NR filter processing and is arranged between the SHD correction unit 13 and a synthesis unit 20. Similarly, the filtering unit 64 performs, for example, NR filter processing and is arranged between the SHD correction unit 14 and the synthesis unit 20.

The filtering unit 65 performs, for example, Finite Impulse Response (FIR) filter processing and is arranged between a moving subject detection unit 17 and a synthesis rate control unit 19. The filtering unit 66 performs, for example, FIR filter processing and is arranged between a synthesis rate calculation unit 18 and the synthesis rate control unit 19. The filtering unit 67 performs, for example, FIR filter processing and is arranged between the synthesis rate control unit 19 and the synthesis unit 20.

Other components of the image processing device 60 are the same as those of the image processing device 50 and are denoted with the same reference numerals. Therefore, description thereof will be omitted.

<Modification>

The image processing devices 10 to 60 described above receive the large pixel image and the small pixel image having the same exposure time as inputs. However, it is preferable that one of the exposure times at the time of imaging the large pixel image and the small pixel image may be lengthened, and the other exposure time is shortened. However, the shorter exposure time is made to be included in the longer exposure time. As a result, a dynamic range of a WD image to be generated can be widened.

Furthermore, instead of receiving the large pixel image and the small pixel image as inputs, a high-sensitivity image including an output of a pixel with relatively high sensitivity and a low-sensitivity image including an output of a pixel with relatively low sensitivity may be input.

In addition, the present disclosure can be applied to a case where three or more images including outputs from three or more kinds of pixels having different sensitivities are received as inputs and the images are synthesized to form a WD image.

Note that a series of processing performed by the image processing devices 10 to 60 described above can be performed by hardware and software. In a case where the series of the processing is performed by the software, a program included in the software is installed in a computer. Here, the computer includes a computer incorporated in dedicated hardware and, for example, a general personal computer or the like which can perform various functions by installing various programs.

FIG. 7 is a block diagram of an exemplary configuration of hardware of the computer for executing the above-mentioned series of processing by the program.

In a computer 100, a central processing unit (CPU) 101, a read only memory (ROM) 102, and a random access memory (RAM) 103 are connected to each other with a bus 104.

In addition, an input/output interface 105 is connected to the bus 104. An input unit 106, an output unit 107, a storage unit 108, a communication unit 109, and a drive 110 are connected to the input/output interface 105.

The input unit 106 includes a keyboard, a mouse, a microphone, and the like. The output unit 107 includes a display, a speaker, and the like. The storage unit 108 includes a hard disk, a non-volatile memory, and the like. The communication unit 109 includes a network interface and the like. The drive 110 drives a removable medium 111 such as a magnetic disk, an optical disk, an optical magnetic disk, or a semiconductor memory.

In the computer 100 configured as described above, the CPU 101 loads, for example, a program stored in the storage unit 108 to the RAM 103 via the input/output interface 105 and the bus 104 and executes the program so that the above-mentioned series of processing is performed.

The program executed by the computer 100 (CPU 101), for example, can be provided by recording it to the removable medium 111 as a package medium and the like. Furthermore, the program can be provided via a wired or wireless transmission media such as a local area network, the internet, and digital satellite broadcasting.

In the computer 100, the program can be installed to the storage unit 108 via the input/output interface 105 by mounting the removable medium 111 in the drive 110. Furthermore, the program can be received by the communication unit 109 via the wired or wireless transmission medium and installed to the storage unit 108. In addition, the program can be previously installed to the ROM 102 and the storage unit 108.

Note that, the program performed by the computer 100 may be a program in which processing is performed along the order described herein in a time series manner and a program in which the processing is performed in parallel or at a necessary timing, for example, when a call has been performed.

Note that, the embodiment of the present disclosure is not limited to the embodiments described above and can be variously changed without departing from the scope of the present disclosure.

The present disclosure can have a configuration below.

(1) An image processing device including:
a plurality of filtering units configured to perform predetermined filter processing on each of a plurality of captured images including outputs from a plurality of pixels having different sensitivities;
a synthesis rate calculation unit configured to calculate a synthesis rate by using at least one of filter processing results by the plurality of filtering units;
a plurality of shading correction units configured to perform shading correction processing respectively on the plurality of captured images;
a moving subject detection unit configured to detect a moving subject on the basis of a result of multiplying each of the filter processing results by the plurality of filtering units by a gain at the time of performing the shading correction processing on the corresponding captured image;
a synthesis rate control unit configured to control the calculated synthesis rate on the basis of the result of the moving subject detection; and
a synthesis unit configured to synthesize shading processing results by the plurality of shading correction units according to the controlled synthesis rate.

(2) The image processing device according to (1), in which the plurality of captured images is a large pixel image including an output of a large pixel and a small pixel image including an output of a small pixel having a narrower light receiving surface than the large pixel.

(3)

The image processing device according to (2), in which the large pixel image and the small pixel image have different exposure times.

(4)

The image processing device according to any one of (1) to (3), in which the moving subject detection unit detects a moving subject on the basis of a comparison result between a difference of results of multiplying the filter processing results by the plurality of filtering units by a gain at the time of performing the shading correction processing on the corresponding captured image and a predetermined threshold.

(5)

The image processing device according to any one of (1) to (4), in which the shading correction unit performs the shading correction processing on the captured image before being input to the filtering unit.

(6)

The image processing device according to any one of (1) to (4), in which the shading correction unit performs the shading correction processing on the captured image which has passed through the filtering unit.

(7)

The image processing device according to any one of (1) to (4), in which the shading correction unit performs the shading correction processing on the captured image on which the filter processing has been performed by the filtering unit.

(8)

The image processing device according to any one of (1) to (7), in which the synthesis rate control unit controls the synthesis rate so as to apply the calculated synthesis rate to a region where the moving subject is not detected and to preferentially use any one of the shading processing results by the plurality of shading correction units on a region where the moving subject is detected.

(9)

An image processing method performed by an image processing device, the method including:

a filter processing step of performing predetermined filter processing on each of a plurality of captured images including outputs from a plurality of pixels having different sensitivities;

a synthesis rate calculation step of calculating a synthesis rate by using at least one of a plurality of filter processing results by the filter processing step;

a shading correction step of performing shading correction processing on each of the plurality of captured images;

a moving subject detection step of detecting a moving subject on the basis of a result of multiplying each of the plurality of filter processing results by the filter processing step by a gain at the time of performing the shading correction processing on the corresponding captured image;

a synthesis rate control step of controlling the calculated synthesis rate on the basis of the result of the moving subject detection; and a synthesis step of synthesizing shading processing results by the plurality of shading correction units according to the controlled synthesis rate.

(10) A non-transitory computer-readable storage medium which stores a program for causing a computer to function as:

a plurality of filtering units configured to perform predetermined filter processing on each of a plurality of captured images including outputs from a plurality of pixels having different sensitivities;

a synthesis rate calculation unit configured to calculate a synthesis rate by using at least one of filter processing results by the plurality of filtering units;

a plurality of shading correction units configured to perform shading correction processing respectively on the plurality of captured images;

a moving subject detection unit configured to detect a moving subject on the basis of a result of multiplying each of the filter processing results by the plurality of filtering units by a gain at the time of performing the shading correction processing on the corresponding captured image;

a synthesis rate control unit configured to control the calculated synthesis rate on the basis of the result of the moving subject detection; and a synthesis unit configured to synthesize shading processing results by the plurality of shading correction units according to the controlled synthesis rate.

REFERENCE SIGNS LIST 10 image processing device
11 filtering unit
12 filtering unit
13 SHD correction unit
14 SHD correction unit
15 multiplication unit
16 multiplication unit
17 moving subject detection unit
18 synthesis rate calculation unit
19 synthesis rate control unit
20 synthesis unit
30 image processing device
40 image processing device
50 image processing device
51 filtering unit
52 filtering unit
60 image processing device
61 filtering unit
62 filtering unit
63 filtering unit
64 filtering unit
65 filtering unit
66 filtering unit
67 filtering unit
100 computer
101 CPU

The invention claimed is:

1. An image processing device comprising:
a plurality of filtering units configured to perform predetermined filter processing on each of a plurality of captured images including outputs from a plurality of pixels having different sensitivities;
a synthesis rate calculation unit configured to calculate a synthesis rate by using at least one of filter processing results by the plurality of filtering units;
a plurality of shading correction units configured to perform shading correction processing respectively on the plurality of captured images;
a moving subject detection unit configured to detect a moving subject on a basis of a result of multiplying each of the filter processing results by the plurality of filtering units by a gain at a time of performing the shading correction processing on a corresponding captured image of the plurality of captured images;

a synthesis rate control unit configured to control the calculated synthesis rate on a basis of a result of the moving subject detection; and a synthesis unit configured to synthesize shading processing results by the plurality of shading correction units according to the controlled synthesis rate.

2. The image processing device according to claim 1, wherein
the plurality of captured images is a large pixel image including an output of a large pixel and a small pixel image including an output of a small pixel having a narrower light receiving surface than the large pixel.

3. The image processing device according to claim 2, wherein
the large pixel image and the small pixel image have different exposure times.

4. The image processing device according to claim 2, wherein
the moving subject detection unit detects the moving subject on a basis of a comparison result between a difference of results of multiplying the filter processing results by the plurality of filtering units by the gain at the time of performing the shading correction processing on the corresponding captured image and a predetermined threshold.

5. The image processing device according to claim 2, wherein
the plurality of shading correction units performs the shading correction processing on the plurality of captured images before being input to the plurality of filtering units.

6. The image processing device according to claim 2, wherein the plurality of shading correction units performs the shading correction processing on the plurality of captured images which has passed through the plurality of filtering units.

7. The image processing device according to claim 2, wherein
the plurality of shading correction units performs the shading correction processing on the plurality of captured images on which the predetermined filter processing has been performed by the plurality of filtering units.

8. The image processing device according to claim 2, wherein
the synthesis rate control unit controls the synthesis rate so as to apply the calculated synthesis rate to a region where the moving subject is not detected and to preferentially use any one of the shading processing results by the plurality of shading correction units on a region where the moving subject is detected.

9. An image processing method performed by an image processing device, the method comprising:
a filter processing step of performing predetermined filter processing on each of a plurality of captured images including outputs from a plurality of pixels having different sensitivities;

a synthesis rate calculation step of calculating a synthesis rate by using at least one of a plurality of filter processing results by the filter processing step;

a shading correction step of performing shading correction processing on each of the plurality of captured images;

a moving subject detection step of detecting a moving subject on a basis of a result of multiplying each of the plurality of filter processing results by the filter processing step by a gain at a time of performing the shading correction processing on a corresponding captured image of the plurality of captured images;

a synthesis rate control step of controlling the calculated synthesis rate on a basis of a result of the moving subject detection; and a synthesis step of synthesizing shading processing results by the shading correction step according to the controlled synthesis rate.

10. A non-transitory computer-readable storage medium having stored thereon, computer-executable instructions which, when executed by a computer, cause the computer to execute operations, the operations comprising:
performing predetermined filter processing on each of a plurality of captured images including outputs from a plurality of pixels having different sensitivities;

calculating a synthesis rate by using at least one of filter processing results of performing the predetermined filter processing;

performing shading correction processing respectively on the plurality of captured images;

detecting a moving subject on a basis of a result of multiplying each of the filter processing results of performing the predetermined filter processing by a gain at a time of performing the shading correction processing on a corresponding captured image of the plurality of captured images;

controlling the calculated synthesis rate on a basis of a result of the moving subject detection; and synthesizing shading processing results of the shading correction processing according to the controlled synthesis rate.

* * * * *